United States Patent

Rouis, Robert J.

[15] 3,648,539
[45] Mar. 14, 1972

[54] ELECTRICALLY OPERATED, REMOTE CONTROLLED WHEEL TURNER

[72] Inventor: Rouis, Robert J., c/o Align-rite Inc., 130 Beacon Street, San Mateo, Calif. 94104

[22] Filed: Jan. 28, 1970

[21] Appl. No.: 6,337

[52] U.S. Cl. ............................................... 74/494, 180/79.1
[51] Int. Cl. ........................................................... B62d 1/24
[58] Field of Search ......................... 180/79.1, 77; 74/494

[56] References Cited

UNITED STATES PATENTS

| | | | |
|---|---|---|---|
| 2,928,291 | 3/1960 | Wilkerson | 74/494 |
| 2,805,585 | 9/1957 | Besserman | 180/79.1 UX |
| 3,003,363 | 10/1961 | De Hart | 180/77 X |
| 3,404,917 | 10/1968 | Smith | 297/250 |

*Primary Examiner*—Benjamin Hersh
*Assistant Examiner*—John A. Pekar
*Attorney*—Julian Caplan

[57] ABSTRACT

In testing and repairing front wheels of vehicles, it is necessary to turn the wheels from time to time. The present device turns the steering wheel and thus turns the vehicle wheels. A rubber roller engages the steering wheel and is turned in either direction by a motor. Reversal of the motor is controlled by a remote switch held by the operator at the vehicle wheel. The power source for the motor may be the cigar lighter electric socket.

2 Claims, 3 Drawing Figures

Patented March 14, 1972

3,648,539

INVENTOR.
ROBERT J. ROUIS
BY
Julian Caplan
ATTORNEY

ELECTRICALLY OPERATED, REMOTE CONTROLLED WHEEL TURNER

This invention relates to a new and improved electrically operated remote controlled wheel turner. In testing and repairing the alignment and other functions of the front wheels of vehicles, it is necessary for the workmen to turn the front wheels from time to time. Heretofore, this has been accomplished either by manually turning the steering wheel, which requires either the services of an assistant or that the workman leave his position at the front wheel and reach into the interior of the vehicle, or has required considerable manual effort of the workman in moving the vehicle wheel at its location, which requires a great effort and usually requires that the operator stand in order to brace himself against the fender or other stationary portion of the car. The present invention makes it possible for the workman to turn the vehicle wheels without using physical effort and without leaving his working position.

Accordingly, a principal purpose of the present invention is to provide a compact, readily portable device which fits on the vehicle seat and is installed with a rubber roller engaging the bottom of the steering wheel, the rubber roller being motor controlled from a remote position at the vehicle wheel. Thus a principal feature of the invention is the fact that the device is easily installed and removed and there is no need to make any mechanical connection between the device and the steering wheel.

A principal advantage of the invention is the reduction in time required to turn the vehicle wheels and thus a reduction in the cost of wheel aligning and other operations of a similar nature.

Another feature of the invention is the considerable reduction in the physical effort required to turn the vehicle wheels. Where there is power steering or in other installations where the ratio between the degree of turning of the vehicle wheel and the degree of turning of the steering wheel is high, the force required to turn the wheels by applying a turning moment to the vehicle wheels themselves is extremely high.

Other objects of the present invention will become apparent upon reading the following specification and referring to the accompanying drawings in which similar characters of reference represent corresponding parts in each of the several views.

Figure 1:
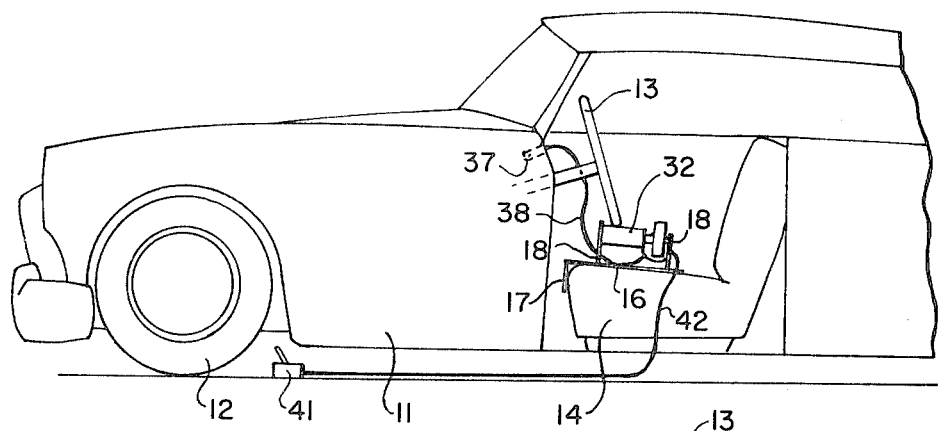
FIG. 1 is a side elevational view of a vehicle with the device installed.

Vehicle 11 has front wheels 12 mounted on an axle (not shown) which is turned by a steering wheel 13 through a conventional steering mechanism (also not shown). Wheel 13 is located in the driver compartment of the vehicle immediately above the front seat 14. The present invention comprises a device which is installed on seat 14 immediately below wheel 13. The entire mechanical components of the device are mounted on a plate 16 which fits on top of the seat 14 and has a downturned flange 17 which fits in front of the front edge of seat 14 and prevents the device from sliding rearwardly.

Figure 3:
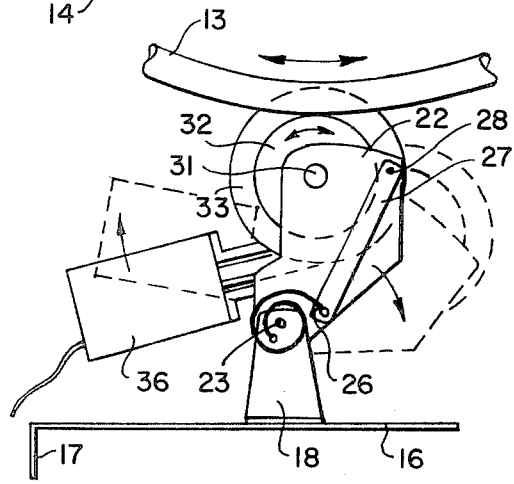
FIG. 3 is an elevation as viewed from the left in FIG. 2 and showing the device in operative position in solid lines and in retracted position in dotted lines.

Mounted on plate 16 are transverse upstanding brackets 18 at front and rear. A yoke 21 oscillates between brackets 18, the base of yoke 21 having flanges 22 which fit immediately inside the brackets 18. Transverse shaft 23 mounts flanges 22 relative to brackets 18 for oscillatory motion. A coil spring 26 is fixed at one end to one bracket 18 and has a lever arm 27 connected by pin 28 to a remote portion of the adjacent flange 22. The function of spring 26 is to bias yoke 21 in a counterclockwise direction as viewed in FIG. 3.

Mounted between flanges 22 is a shaft 31 which carries a soft rubber roller 32 of somewhat extended length which fits under the steering wheel 13. Spring 26 biases roller 32 so that it engages wheel 13. When, as hereinafter explained, the roller 32 is turned in either direction, the contact of the rubber roller causes the wheel 13 to turn in the opposite direction.

Likewise mounted on shaft 31 is a worm wheel 33 which is engaged by a worm on shaft 34 of motor 36. Motor 36 is reversible. A convenient source of power for motor 36 is by the insertion of a plug 37 into the socket of the cigar lighter on the dash of the vehicle 11. Cord 38 leads from plug 37 to a terminal box (not shown) to which is also connected the cord 42 of a remote control, double pole, double throw switch 41. The cord 42 extends to a location near one of the front wheels 12.

Figure 2:
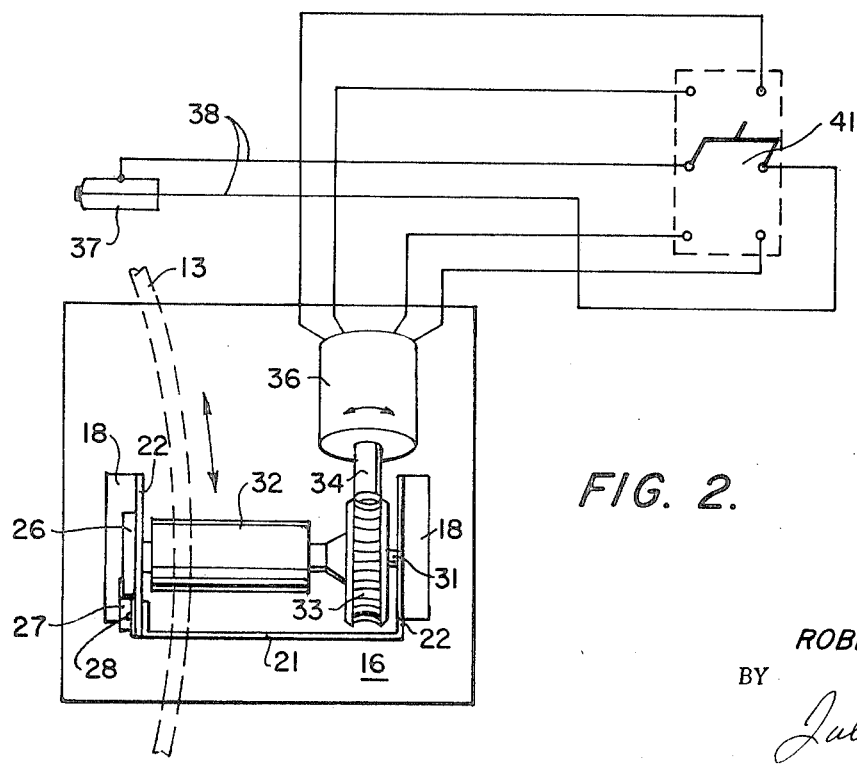
FIG. 2 is a top plan of the device which also shows, schematically, the wiring of the device.

In use, the switch 41 is turned by the operator to any one of three positions. In middle position (shown in FIG. 2) the motor 36 is deenergized. When the switch 41 is thrown in one of its two operative positions, the motor 36 is turned in one direction and when it is thrown in the other operative position, motor 36 is turned in the opposite direction. Turning of motor 36 through a gear reduction causes turning of roller 32. By reason of the contact of roller 32 on the underside of wheel 13, the wheel 13 and in turn the wheel 12 are turned. Thus, the operator by operation of switch 41 may cause the wheels 12 to be turned in either direction and stopped at will.

It will be seen that the plate 16 may readily be installed in any vehicle and by reason of the spring 26 and the length of the roller 32, there is great versatility in the installation in that a single device will fit vehicles of various types.

Although the foregoing invention has been described in some detail, by way of illustration and example for purposes of clarity of understanding, it is understood that certain changes and modifications may be practiced within the spirit of the invention and scope of the appended claims.

What is claimed is:

1. A device to turn a vehicle steering wheel and thereby to turn the front wheels of the vehicle comprising a mounting plate adapted to fit on top of the driver's seat of said vehicle below the steering wheel, a roller having a resilient surface adapted to fit against and to turn said steering wheel, mounted with its axis of revolution parallel to the normal direction of movement of the vehicle, a first bracket on said plate, a second bracket on said roller, means pivotally connecting said brackets, means to adjust said second bracket in position with said roller in driving contact with steering wheel, resilient means biasing said roller into said contact, a reversible motor, and drive means driving said roller from said motor.

2. A device according to claim 1 which further comprises a source of electric power for said motor, a switch between said source and said motor to drive said motor in either direction and to stop said motor, a long electric cord having said switch at its outer end and connected at its inner end to said source and said motor, said cord of sufficient length to reach from the steering wheel to either of the front wheels of the vehicle, said source having a terminal at the vehicle cigar lighter socket, and a plug shaped to fit within and establish electrical contact with said socket, said plug electrically connected to said cord.

* * * * *